US011288652B1

(12) United States Patent
Steiner et al.

(10) Patent No.: US 11,288,652 B1
(45) Date of Patent: Mar. 29, 2022

(54) RADIO-FREQUENCY-IDENTIFICATION-BASED CHECKOUT PROCESS

(71) Applicant: Toshiba Global Commerce Solutions Holdings Corporation, Tokyo (JP)

(72) Inventors: David Steiner, Raleigh, NC (US); Kimberly Wood, Raleigh, NC (US); Timothy W. Crockett, Raleigh, NC (US); Jose R. Figueroa, McDonough, GA (US); Suzanne M. Bleakley, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/085,644

(22) Filed: Oct. 30, 2020

(51) Int. Cl.
*G06Q 20/20* (2012.01)
*G06Q 20/38* (2012.01)
*G08B 13/24* (2006.01)
*G06Q 20/40* (2012.01)
*G06Q 20/42* (2012.01)

(52) U.S. Cl.
CPC ......... *G06Q 20/208* (2013.01); *G06Q 20/389* (2013.01); *G06Q 20/401* (2013.01); *G06Q 20/42* (2013.01); *G08B 13/2417* (2013.01)

(58) Field of Classification Search
CPC .. G06Q 20/208; G06Q 20/389; G06Q 20/401; G06Q 20/42; G08B 13/2417
See application file for complete search history.

(56) References Cited

U.S. PATENT DOCUMENTS

| 4,676,343 A | * | 6/1987 | Humble | A47F 9/047 177/50 |
| 4,779,706 A | * | 10/1988 | Mergenthaler | A47F 9/047 177/25.15 |
| 5,494,136 A | * | 2/1996 | Humble | A47F 9/047 186/61 |

(Continued)

FOREIGN PATENT DOCUMENTS

ES   2379821 T3   5/2012

OTHER PUBLICATIONS

Busu, M. F. M., et al. "Auto-checkout system for retails using Radio Frequency Identification (RFID) technology." 2011 IEEE Control and System Graduate Research Colloquium. IEEE, 2011. (Year: 2011).*

(Continued)

*Primary Examiner* — Asfand M Sheikh
(74) *Attorney, Agent, or Firm* — Patterson + Sheridan, LLP (57) ABSTRACT

A method includes scanning, by a checkout station, a plurality of items and determining, by the checkout station, a total price for the plurality of items. Each item of the plurality of items is coupled to a radio frequency identification (RFID) tag that identifies that item. The method also includes detecting, by an RFID scanner of a centralized payment station, one or more of the RFID tags of the plurality of items moving within a threshold distance of the centralized payment station and retrieving, by a hardware processor of the centralized payment station and based on the detected one or more RFID tags, the total price. The method further includes processing, by the hardware processor, a payment in satisfaction of the total price.

20 Claims, 8 Drawing Sheets

(56) References Cited

U.S. PATENT DOCUMENTS

| | | | | |
|---|---|---|---|---|
| 5,609,223 A * | 3/1997 | Iizaka | | G07G 1/0054 |
| | | | | 186/61 |
| 5,747,784 A * | 5/1998 | Walter | | A47F 9/048 |
| | | | | 235/383 |
| 6,179,206 B1 * | 1/2001 | Matsumori | | G06Q 20/343 |
| | | | | 235/375 |
| 7,048,184 B2 * | 5/2006 | Persky | | A47F 9/048 |
| | | | | 235/383 |
| 7,240,824 B2 * | 7/2007 | Stockton | | G06Q 20/387 |
| | | | | 235/375 |
| 7,575,162 B1 * | 8/2009 | Malchak | | A47F 9/047 |
| | | | | 235/375 |
| 8,751,316 B1 * | 6/2014 | Fletchall | | G06Q 20/047 |
| | | | | 705/20 |
| 11,048,890 B2 * | 6/2021 | Khojastepour | | H04B 1/0064 |
| 2002/0079367 A1 * | 6/2002 | Montani | | A47F 9/047 |
| | | | | 235/383 |
| 2004/0069848 A1 * | 4/2004 | Persky | | G07G 1/0054 |
| | | | | 235/383 |
| 2006/0180662 A1 * | 8/2006 | Pirruccio | | A47F 9/048 |
| | | | | 235/383 |
| 2008/0211671 A1 * | 9/2008 | Daily | | G07G 1/0036 |
| | | | | 340/572.1 |
| 2009/0101713 A1 * | 4/2009 | Ulrich | | G06Q 20/208 |
| | | | | 235/383 |
| 2010/0318440 A1 * | 12/2010 | Coveley | | G07G 1/0036 |
| | | | | 705/26.1 |
| 2011/0168775 A1 | 7/2011 | Van Zetten | | |
| 2013/0073432 A1 * | 3/2013 | Mulholland | | G06Q 20/12 |
| | | | | 705/26.61 |
| 2013/0179238 A1 * | 7/2013 | Warner, IV | | G07B 15/00 |
| | | | | 705/13 |
| 2015/0041535 A1 * | 2/2015 | Daily | | A47F 9/047 |
| | | | | 235/381 |
| 2017/0200152 A1 * | 7/2017 | Winkler | | G06Q 20/204 |
| 2017/0208970 A1 * | 7/2017 | Ryner | | G06Q 20/20 |
| 2018/0032986 A1 * | 2/2018 | Miyagi | | G07G 1/0036 |
| 2018/0286185 A1 * | 10/2018 | Humphrys | | G06Q 20/3224 |
| 2021/0248879 A1 * | 8/2021 | Khojastepour | | G07C 9/00 |

OTHER PUBLICATIONS

Sawant, Ms Rupali, et al. "The RFID based smart shopping cart." International Journal of Engineering Research and General Science 3.2 (2015): 275-280. (Year: 2015).*

Unde, Nilesh, et al. "Implementation of Smart Shopping Cart Using RFID." Nov. 2015. (Year: 2015).*

Bocanegra, Carlos, et al. "RFGo: a seamless self-checkout system for apparel stores using RFID." Proceedings of the 26th Annual International Conference on Mobile Computing and Networking. 2020. (Year: 2020).*

Li, Ruinian, et al. "IoT applications on secure smart shopping system." IEEE Internetof Things Journal 4.6 (2017): 1945-1954. (Year :2017).*

* cited by examiner

RADIO-FREQUENCY-IDENTIFICATION-BASED CHECKOUT PROCESS

BACKGROUND

The present invention relates to checkout machines in physical stores, and more specifically, to a radio-frequency-based checkout process. Stores are implementing more self-checkout options in which customers scan the items that they wish to purchase, instead of having a store associate scan the items. The stores install checkout areas equipped with multiple checkout scanners where customers can go to scan their items. Conventionally, each of these checkout scanners include payment receivers (e.g., bill handlers, coin handlers, card scanners, etc.) that the customers can use to pay for their items. These payment receivers, however, occupy a large footprint and are difficult to install and maintain. In particular, bill handlers and coin handlers are necessarily large so that they can store, count, and dispense a variety of bills and coins. They also include many mechanical components used to identify and sort the bills and coins. These mechanical components wear down over time, resulting in the bill and coin handlers malfunctioning.

SUMMARY

According to one embodiment, a method includes scanning, by a checkout station, a plurality of items and determining, by the checkout station, a total price for the plurality of items. Each item of the plurality of items is coupled to a radio frequency identification (RFID) tag that identifies that item. The method also includes detecting, by an RFID scanner of a centralized payment station, one or more of the RFID tags of the plurality of items moving within a threshold distance of the centralized payment station and retrieving, by a hardware processor of the centralized payment station and based on the detected one or more RFID tags, the total price. The method further includes processing, by the hardware processor, a payment in satisfaction of the total price.

According to another embodiment, a system includes a checkout station and a centralized payment station. The checkout station scans a plurality of items and determines a total price for the plurality of items. Each item of the plurality of items is coupled to an RFID tag that identifies that item. The centralized payment station includes an RFID scanner and a hardware processor. The RFID scanner detects one or more of the RFID tags of the plurality of items moving within a threshold distance of the centralized payment station. The hardware processor retrieves, based on the detected one or more RFID tags, the total price and processes a payment in satisfaction of the total price.

According to another embodiment, a payment station includes an RFID scanner, a hardware processor, and a printer. The RFID scanner detects one or more RFID tags of a plurality of items moving within a threshold distance of the centralized payment station. The hardware processor retrieves, based on the detected one or more RFID tags, a total price for the plurality of items and processes a payment in satisfaction of the total price. The printer prints a receipt after the payment is processed.

DETAILED DESCRIPTION

This disclosure contemplates radio-frequency-based checkout process. Generally, a store implements one or more centralized payment stations at which customers can pay for their purchased items after scanning the items at a self-checkout area. Each of the items are tagged with a radio frequency identification (RFID) tag that identify the item. A payment station includes an RFID scanner that detect the RFID tags of items moving within a threshold distance of the payment stations (e.g., as the customer brings an order towards the payment station for payment). The payment station identifies and/or retrieves the order of the customer based on the detected items. The payment station presents the order to the customer and processes a payment (e.g., through a bill handler, coin handler, and/or card scanner). In this manner, the payment station can handle payments for multiple self-checkout areas, thereby removing the need to install payment receivers at each self-checkout area in certain embodiments. As a result, the size of the self-checkout areas is reduced and maintenance of the self-checkout areas is made simpler.

Figure 1A:
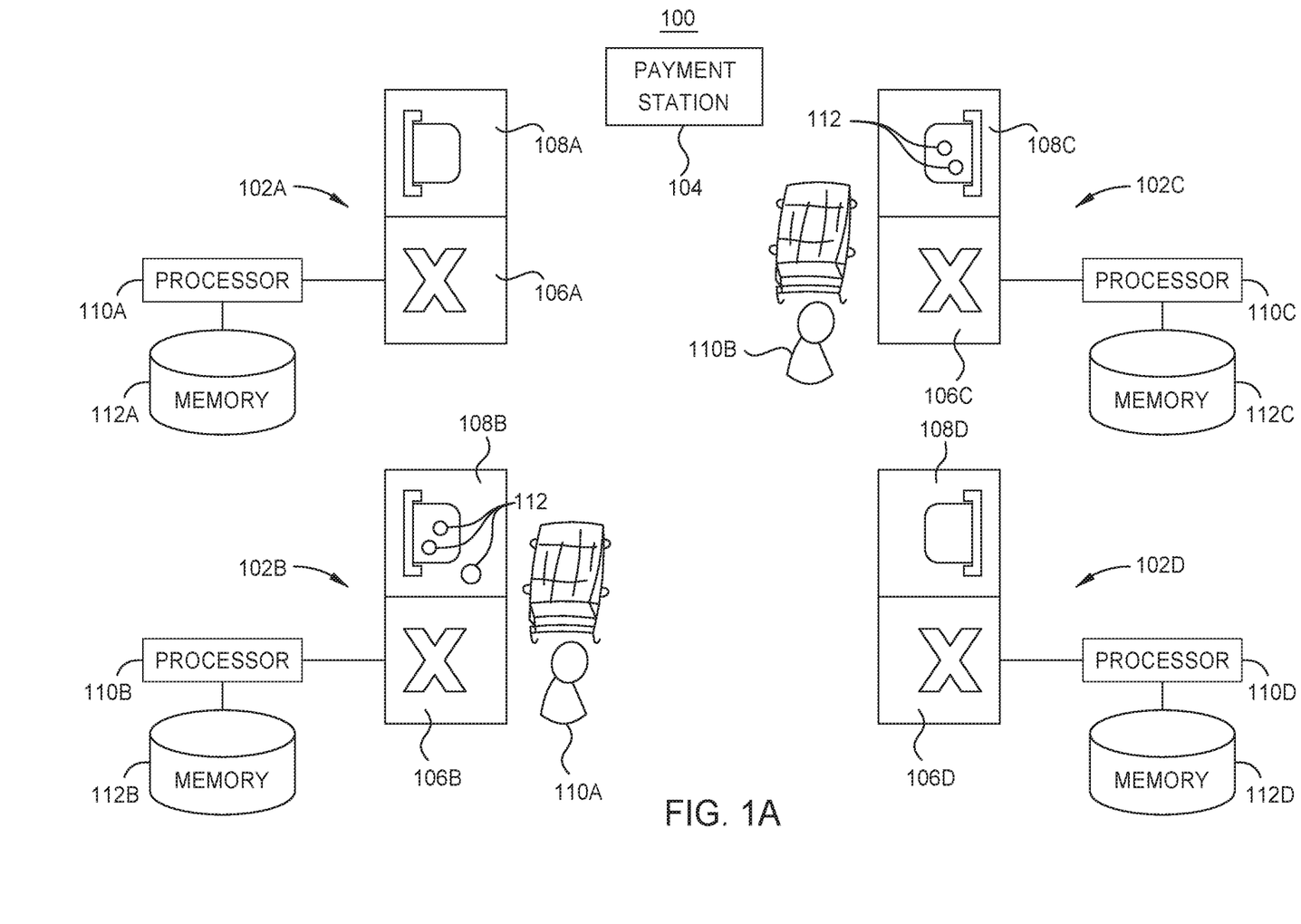
FIGS. 1A and 1B illustrate checkout areas of an example store.

FIG. 1A illustrates a checkout area of an example store 100. Generally, the checkout area includes one or more checkout stations 102 and a centralized payment station 104. Customers 110 scan items 112 at checkout stations 102, and then move to payment station 104 to pay for the items 112. In particular embodiments, the centralized payment station 104 removes the need to have payment receivers installed at each checkout station 102, which reduces the size of the checkout stations 102 and makes maintenance of the checkout stations 102 simpler. For example, the payment station 104 may remove the need to install bill and coin handlers at the checkout stations 102.

The store 100 includes multiple checkout stations 102. In the example of FIG. 1A, the store 100 includes checkout stations 102A-102D. The checkout stations 102 are arranged to provide space for customers 110 to move next to the checkout stations 102 and to scan items 112 at the checkout stations 102. In the example of FIG. 1A, a customer 110A is scanning items 112 at checkout station 102B, and a customer 110B is scanning items 112 at checkout station 102C. When the customers 110A and 110B have completed scanning their items 112, the customers 110A and 110B may proceed to payment station 104 to pay for their items 112.

Each checkout station 102 includes several components that perform the functions of the checkout station 102. For example, each checkout station 102 includes a scanner 106, a bagging station 108, a processor 110, and a memory 112. In the example of FIG. 1A, checkout station 102A includes a scanner 106A, a bagging station 108A, a processor 110A, and a memory 112A. Checkout station 102B includes a scanner 106B, a bagging station 108B, a processor 110B, and a memory 112B. Checkout station 102C includes a scanner 106C, a bagging station 108C, a processor 110C, and a memory 112C. Checkout station 102D includes a scanner 106D, a bagging station 108D, a processor 110D, and a memory 112D.

The scanner 106 may be any suitable scanner that scans a tag or code on an item 112 to identify that item 112. For example, the scanner 106 may be a bar code scanner or an RFID scanner. The scanner 106 may scan a bar code or an RFID tag on the item 112. Scanning the bar code or the RFID tag may produce a unique identifier that identifies the item 112. The checkout station 102 may use the identifier to identify the item 112 and to determine a price for the item 112.

The bagging station 108 includes an area for customers 110 to sort and/or store scanned items 112. For example, the bagging station 108 may include one or more bags, in which the customers 110 may place scanned items 112. In the example of FIG. 1A, customer 110A has placed one or more items 112 in a bag in the bagging station 108B. The customer 1106 has placed one or more items 112 in a bag in the bagging station 108C.

The processor 110 and the memory 112 may be configured to perform any of the functions of the checkout station 102. For example, the processor 110 and the memory 112 may be configured to read the unique identifier for an item 112, look up or retrieve a price for the item 112, and calculate a total price for an order of the customer 110. The processor 110 and memory 112 may also present the items 112 and the total price to the customer 110 on a display of the checkout station 102.

The processor 110 is any electronic circuitry, including, but not limited to microprocessors, application specific integrated circuits (ASIC), application specific instruction set processor (ASIP), and/or state machines, that communicatively couples to memory 112 and controls the operation of the checkout station 102. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the checkout station 102 by processing information (e.g., information received from the scanner 106 and/or memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

After a customer 110 finishes scanning the items 112 for an order, the customer 110 may take the items 112 and move towards payment station 104 to pay for the items 112. Generally, the payment station 104 detects RFID tags on the items 112 as they move towards the payment station 104. The payment station 104 uses these detected RFID tags to identify the customer 110 and/or the order. The payment station 104 then retrieves the order and/or the total price for the order. The payment station 104 then presents the order and the total price to the customer 110 for payment. The customer 110 may then pay for the order in any suitable manner and the payment station 104 processes the payment. In this manner, the payment station 104 handles and processes the payments and orders of multiple customers 110 using multiple checkout stations 102. In certain embodiments, the payment station 104 removes the need for payment receivers to be installed at each checkout station 102, which reduces the size of the checkout stations 102 and makes maintenance of the checkout stations 102 simpler.

Figure 1B:
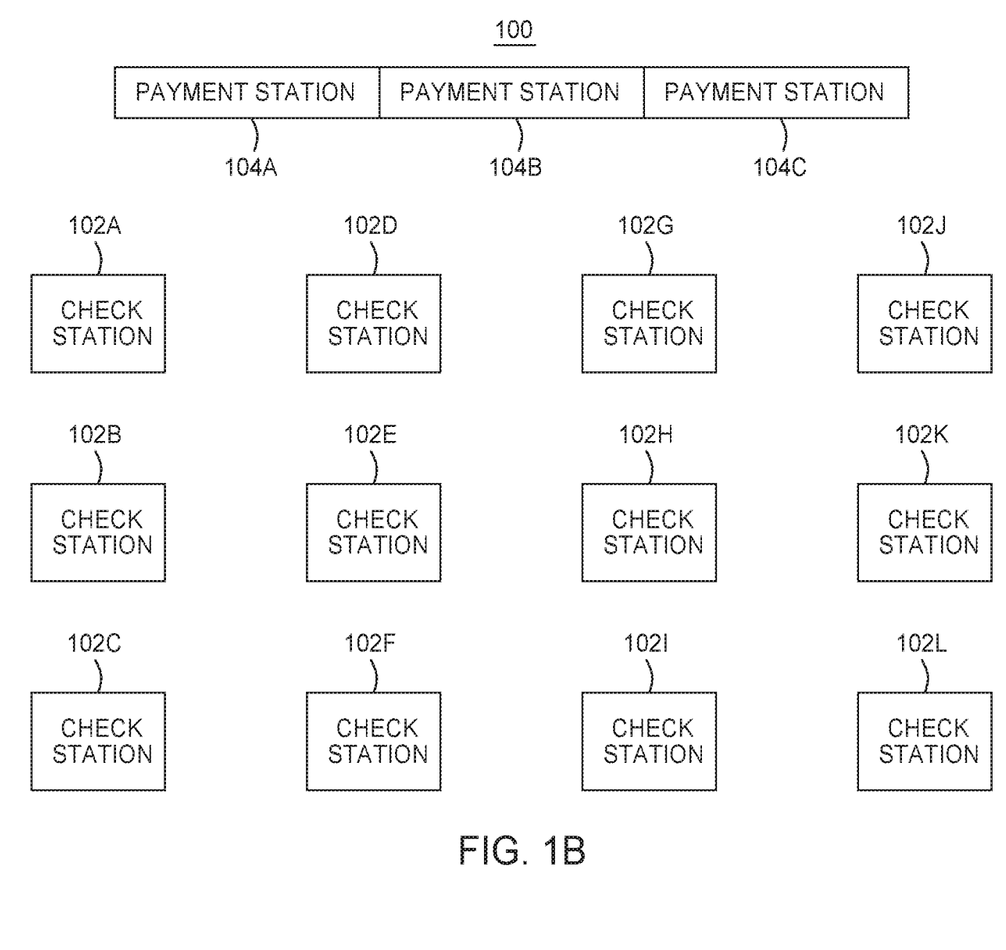

FIG. 1B illustrates a checkout area of the example store 100. Generally, the store 100 in FIG. 1B includes a different configuration of checkout stations 102 and centralized payment stations 104. The store 100 includes more checkout stations 102 and centralized payment stations 104 than the store 100 in FIG. 1A. As seen in FIG. 1B, the store 100 includes twelve checkout stations 102A-102L. Additionally, the store 100 includes multiple payment stations 104A-104C. This disclosure contemplates the store 100 including any suitable number of checkout stations 102 and any suitable number of payment stations 104. Each payment station 104 may handle and process payments for orders from any checkout station 102. In the implementation of FIG. 1B, because there are multiple payment stations 104, multiple customers 110 may pay for their orders simultaneously. The number of checkout stations 102 and the number of payment stations 104 may be adjusted based on customer demand. In some embodiments, there is a fixed ratio of the number of checkout stations 102 to the number of payment stations 104.

Figure 2:
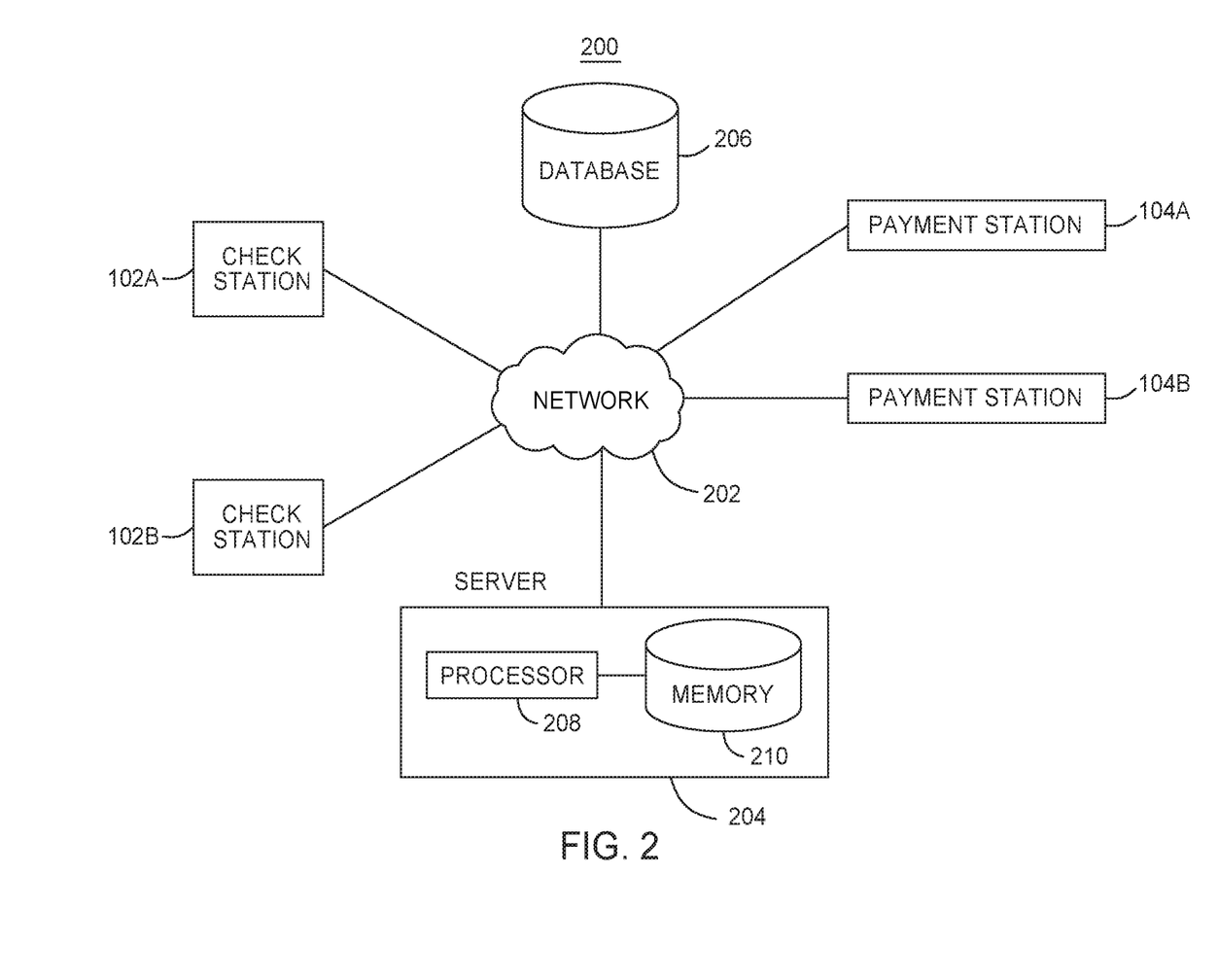
FIG. 2 illustrates an example checkout system for the store of FIGS. 1A and 1B.

FIG. 2 illustrates an example checkout system 200 for the store 100 of FIGS. 1A and 1B. As seen in FIG. 2, the system 200 includes one or more checkout stations 102, one or more payment stations 104, a network 202, a server 204, and a database 206. Generally, the system 200 operates to track the total price of orders scanned at the checkout stations 102 and paid at the payment stations 104.

As discussed previously, the items 112 in an order are scanned at a checkout station 102 such as checkout station 102A or 102B. As the items 112 are scanned, the checkout stations 102 may communicate the scanned codes or tags to the server 204 or the database 206. The server 204 or the database 206 may then respond with an identification of the scanned item 112 and a price for the scanned item 112. The checkout station 102 may keep a running total of price for the order as the prices for the scanned items 112 are received.

The payment stations 104 may detect RFID tags of items 112 moving within a threshold distance of the payment station 104. The payment station 104 may communicate these detected RFID tags to the server 204 or the database 206. Based on the detected RFID tags, the server 204 or the database 206 may look up and return the order or orders that contain the detected items 112. The server 204 or the database 206 may further return the total price of the order or the total prices of the orders. The payment station 104 may then present an identified order and total price to a customer 110 for payment.

In certain embodiments the network 202, the server 204, and/or the database 206 are omitted from the system 200. For example, the checkout stations 102 may be hardwired to the payment stations 104. As another example, the checkout stations 102 and/or the payment stations 104 may store the scanned items 112 of the various orders, and the payment stations 104 may use the detected RFID tags to look up the appropriate order and total price.

The network 202 allows communication between and amongst the various components of the system 100. This disclosure contemplates the network 202 being any suitable network operable to facilitate communication between the components of the system 100. The network 202 may include any interconnecting system capable of transmitting audio, video, signals, data, messages, or any combination of the preceding. The network 202 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The server 204 and/or the database 206 may store and/or communicate orders and their corresponding total prices. The server 204 includes a processor 208 and a memory 210, which are configured to perform any of the functions of the server 204 described herein. For example, the server 204 may receive scanned codes or tags from the checkout stations 102. The server 204 may use these scanned codes or tags to identify a scanned item 112 and to look up the price for the scanned item 112. The server 204 may look up the scanned item 112 and its price from database 206. The server 204 then returns the identification of the item 112 and its price to the checkout station 102. As another example, the server 204 may receive detected RFID tags from payment stations 104. The server 204 may use the detected RFID tags to look up an order that contains the items 112 that correspond to the detected RFID tags. The server 204 may look up these orders from the database 206. The server 204 then communicates the orders and their total prices to the payment station 104. When a payment station 104 indicates that an order has been paid, the server 204 may mark the order as paid in the server 204 and/or the database 206.

The processor 208 is any electronic circuitry, including, but not limited to microprocessors, application specific integrated circuits (ASIC), application specific instruction set processor (ASIP), and/or state machines, that communicatively couples to memory 210 and controls the operation of the server 204. The processor 208 may be 8-bit, 16-bit, 32-bit, 64-bit or of any other suitable architecture. The processor 208 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 208 may include other hardware that operates software to control and process information. The processor 208 executes software stored on memory to perform any of the functions described herein. The processor 208 controls the operation and administration of the server 204 by processing information (e.g., information received from the checkout stations 102, payment stations 104, the database 206, and/or memory 210). The processor 208 may be a programmable logic device, a microcontroller, a microprocessor, any suitable processing device, or any suitable combination of the preceding. The processor 208 is not limited to a single processing device and may encompass multiple processing devices.

The memory 210 may store, either permanently or temporarily, data, operational software, or other information for the processor 208. The memory 210 may include any one or a combination of volatile or non-volatile local or remote devices suitable for storing information. For example, the memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 210, a disk, a CD, or a flash drive. In particular embodiments, the software may include an application executable by the processor 208 to perform one or more of the functions described herein.

The database 206 stores information used by the various components of the system 200. For example, the database 206 may store tables that link codes and/or tags to particular items 112 and their prices. The database 206 may also store tables that link orders to the items 112 in those orders and the RFID tags of those items 112 along with the total price of the order. The database 206 may return this information when requested by another component of the system 200.

Figure 3:
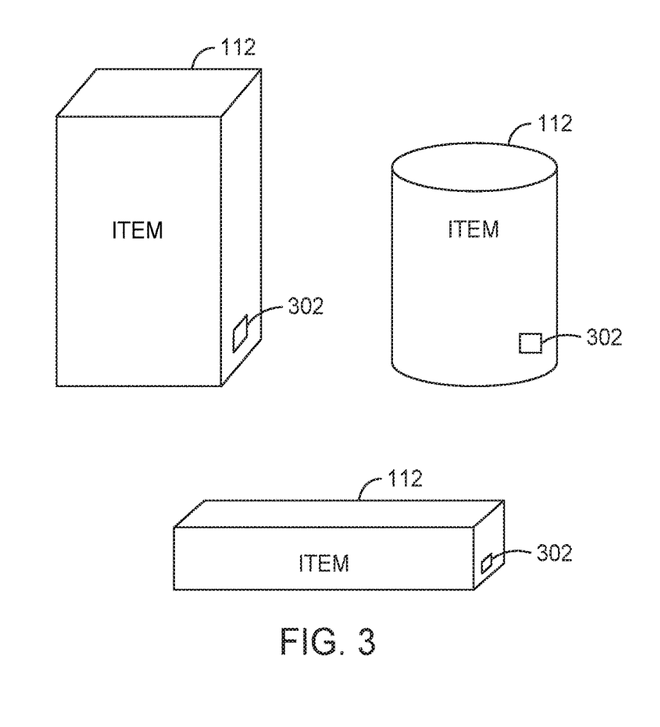
FIG. 3 illustrates example items in the store of FIGS. 1A and 1B.

FIG. 3 illustrates example items 112 in the store 100 of FIGS. 1A and 1B. As seen in FIG. 3, the items 112 may be any shape or size. Each item 112 includes a radio frequency identification (RFID) tag 302. The RFID tag 302 may be located on any portion of the item 112. The RFID tag 302 may be scanned at a checkout station 102 to identify the item 112. Additionally, the payment station 104 may detect the RFID tag 302 when the item 112 or the RFID tag 302 is moved within a threshold distance of the payment station 104.

Figure 4:
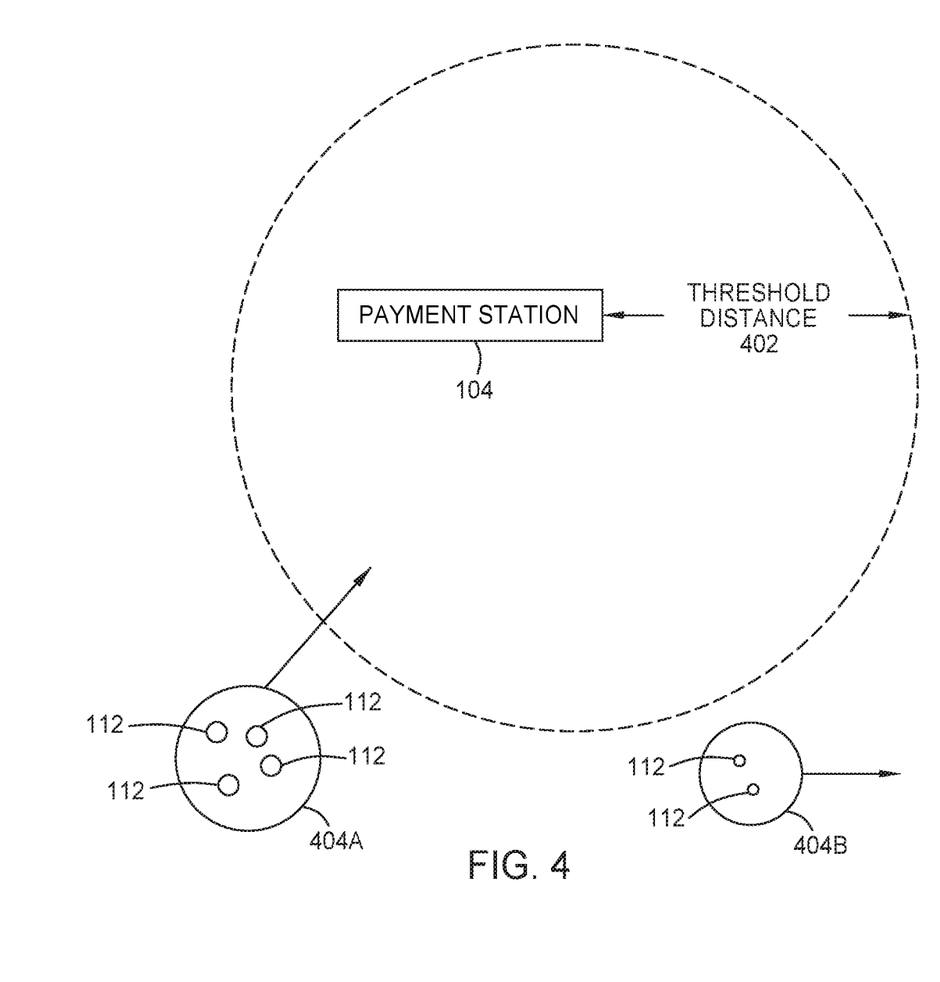
FIG. 4 illustrates an example payment station in the store of FIGS. 1A and 1B.

FIG. 4 illustrates an example payment station 104 in the store 100 of FIGS. 1A and 1B. As seen in FIG. 4, the payment station 104 detects the RFID tags 302 on the items 112 moving within a threshold distance 402 of the payment station 104. The threshold distance 402 may be calibrated by adjusting the strength of an RFID scanner in the payment station 104. For example, the threshold distance 402 may be calibrated based on the proximity of payment stations 104 to each other to reduce duplicate detections by multiple payment stations 104 of the same customer 110. Stated differently, the threshold distance 402 of a payment station 104 may be adjusted to avoid overlap with the threshold distance 402 of another payment station 104. As another example, the threshold distance 402 may be adjusted to avoid detecting the items 112 of multiple customers 110 moving within the threshold distance 402. If the threshold distance 402 were reduced such that only one customer 110 could fit within the threshold distance 402, then the payment station 104 would not encounter the conflict of two customers 110 moving their items 112 within the threshold distance 402 simultaneously. In some embodiments, if the payment station 104 detects the items 112 of multiple customers 110 moving within the threshold distance 402, the payment station 104 may display the orders for the detected items 112 and ask the customer 110 at the payment station which order belongs to that customer 110.

As a customer 110 moves towards the payment station 104 to pay for an order, the customer 110 may also move a group of items 112 towards the payment station 104. For example, the customer 110 may push a shopping cart of items 112 towards payment station 104 or the customer 110 may carry a basket or bag of items 112 towards the payment station 104. As items 112 move within the threshold distance 402 of the payment station 104, the payment station 104 may detect a group 404 of items 112 based on their RFID tags 302. The group 404 may not include every item 112 that the customer 110 purchased. For example, the customer 110 may be carrying only one bag of items 112 towards the payment station 104 and leaving the remaining items 112 in a shopping cart. The payment station 104 may determine the RFID tags and the items 112 in the group 404 as the customer 110 moves towards the payment station 104. The payment station 104 may look up the order of the customer based on the detected RFID tags 302. When the customer 110 reaches the payment station 104, the payment station 104 may present the order to the customer 110 and then process payment for the order.

In the example of FIG. 4, the payment station 104 detects a group 404A of items 112 moving within the threshold distance 402 of the payment station 104. In response, the payment station 104 retrieves an order based on the detected RFID tags 302 of the items 112 in the group 404A. Another group 404B of items 112 is moving away from the payment station 104. For example, the group 404B may belong to a customer 110 that has completed a payment at the payment station 104. The customer 110 may be walking away from the payment station 104 towards an exit. When the group 404B moves out of the threshold distance 402, the payment station 104 will not detect the RFID tags 302 of the items 112 in the group 404B moving within the threshold distance 402. The payment station 104 may then detect the group 404A and retrieve an order for the group 404A.

Figure 5:
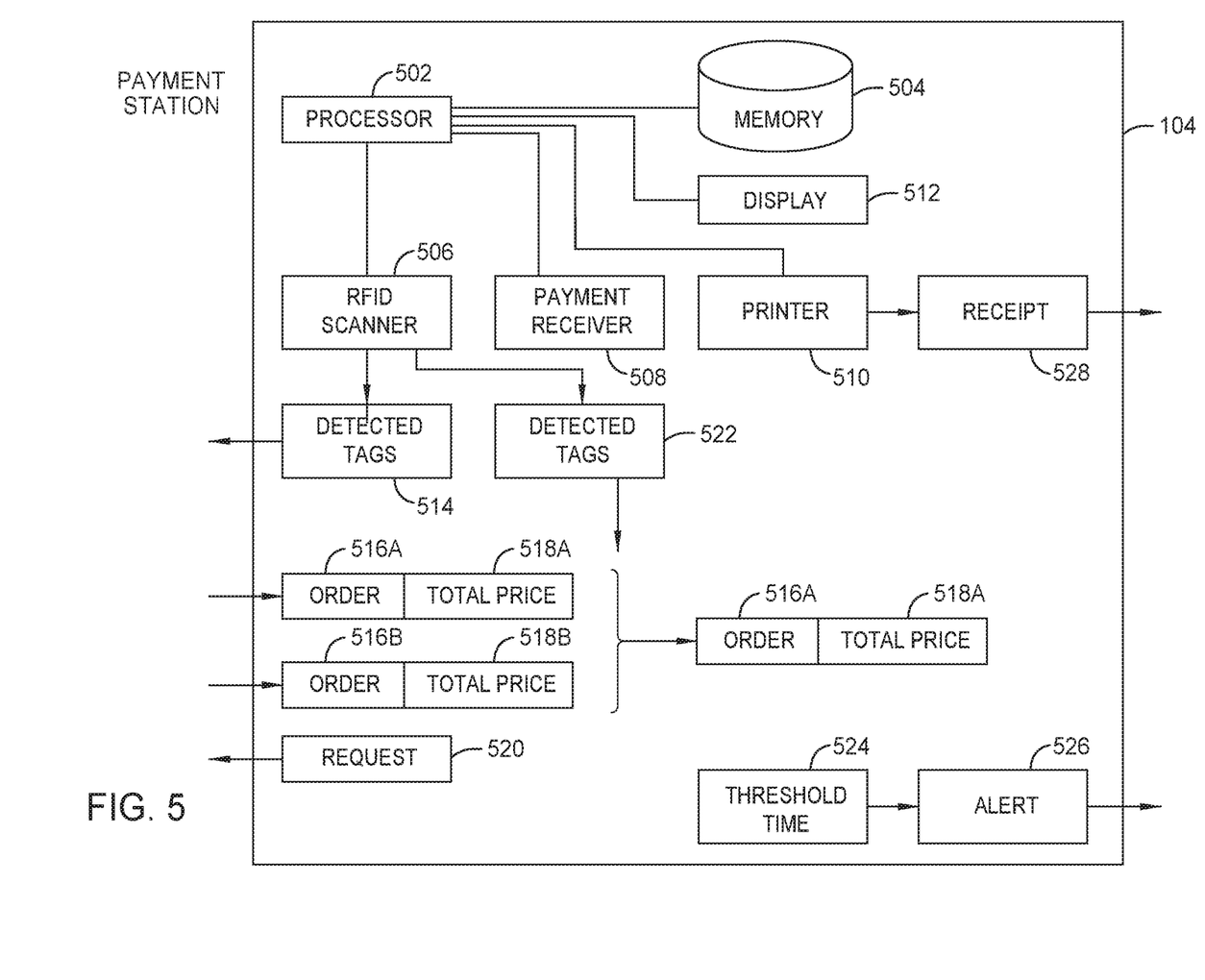
FIG. 5 illustrates an example payment station in the store of FIGS. 1A and 1B.

FIG. 5 illustrates an example payment station 104 in the store 100 of FIGS. 1A and 1B. Generally, the payment station 104 includes a processor 502, a memory 504, an RFID scanner 506, a payment receiver 508, a printer 510, and a display 512, which may be configured to perform any of the functions of the payment station 104 described herein. In particular embodiments, the payment station 104 removes the need to install payment receivers at each checkout station 102 of a store 100, which reduces the size of the checkout stations 102 and makes maintenance of the checkout stations 102 simpler. For example, the payment station 104 may remove the need to install bill and coin handlers at the checkout stations 102.

The processor 502 is any electronic circuitry, including, but not limited to microprocessors, application specific integrated circuits (ASIC), application specific instruction set processor (ASIP), and/or state machines, that communicatively couples to memory 504 and controls the operation of the payment station 502. The processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 502 may include other hardware that operates software to control and process information. The processor 502 executes software stored on memory to perform any of the functions described herein. The processor 502 controls the operation and administration of the payment station 104 by processing information (e.g., information received from the checkout stations 102, the server 204, the database 206, and/or the memory 504). The processor 502 may be a programmable logic device, a microcontroller, a microprocessor, any suitable processing device, or any suitable combination of the preceding. The processor 502 is not limited to a single processing device and may encompass multiple processing devices.

The memory 504 may store, either permanently or temporarily, data, operational software, or other information for the processor 502. The memory 504 may include any one or a combination of volatile or non-volatile local or remote devices suitable for storing information. For example, the memory 504 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 504, a disk, a CD, or a flash drive. In particular embodiments, the software may include an application executable by the processor 502 to perform one or more of the functions described herein.

The RFID scanner 506 detects RFID tags 302 moving within a threshold distance 402 of the payment station 104. The RFID scanner 506 may be any suitable scanner that detects RFID tags moving within the threshold distance 402. In the example of FIG. 5, the RFID scanner 506 detects tags 514 moving within the threshold distance 402 of the payment station 104. The payment station 104 communicates the detected tags 514 to look up orders and total prices corresponding to the items 112 belonging to the detected tags 514. For example, the payment station 104 may communicate the detected tags 514 to a server 204 or a database 206.

The payment station 104 may receive one or more orders 516 and one or more total prices 518 in response to communicating the detected tags 514. In some instances, the payment station 104 receives only one order 516 and one total price 518 in response to communicating the detected tags 514. In these instances, the payment station 104 may present the order 516 and the total price 518 on the display 512. The customer 110 may then verify the order 516 and the total price 518 and present payment through the payment receiver 508 to pay the total price 518 for the order 516. After the user 110 pays for the order 516, the printer 510 prints a receipt 528 for the customer 110.

In some instances, the payment station 104 receives multiple orders 516 and multiple total prices 518 in response to communicating the detected tags 514. In the example of FIG. 5, the payment station 104 receives an order 516A along with its total price 518A and an order 516B along with its total price 518B. The payment station 104 communicates a request 520 to request that the customer 110 move additional items 112 of the order towards the payment station 104. For example, the payment station 104 may present the request 520 on the display 512. When the customer 110 brings additional items 112 towards the payment station 104, the RFID scanner 506 may detect additional RFID tags 302 of items 112 in the order. In the example of FIG. 5, the RFID scanner 506 detects additional tags 522. The payment station 104 then uses the detected tags 522 to select an order 516 of the returned orders 516. In the example of FIG. 5, the payment station 104 uses the detected tags 522 to determine that the order 516A and the total price 518A represents the order of the customer 110. In certain embodiments, the payment station 104 may communicate the detected tags 514 and the detected tags 522 to a server 204 or a database 206 to re-look up orders 516 and total prices 518. When the payment station 104 communicates the detected tags 514 and the detected tags 522, the payment station 104 retrieves the order 516A and the total price 518A. This process of requesting additional tags may continue until the payment station 104 identifies an exact order 516. In the event that there are multiple, identical orders 516, the payment station 104 selects one of the orders 510 for the customer 110 to pay.

After determining the order 516 and the total price 518, the payment station 104 may present the order 516 and the total price 518 on the display 512. The customer 110 may view the order 516 and the total price 518 on the display 512 to verify the order 516 and the total price 518. The customer may then present payment for the order 516 and the total price 518 using the payment receiver 508. The payment receiver 508 may be any suitable mechanism for accepting payment from the customer 110. For example, the payment receiver 508 may include a bill handler, a coin handler, and/or a card scanner. The customer 110 may present bills to the bill handler, coins to the coin handler, and/or a card to the card scanner to pay for the order 516. When the payment station 104 determines that the total price 518 has been paid, the printer 510 prints a receipt 528 for the customer 110.

In particular embodiments, the payment station 104 communicates an alert 526 if the total price 518 has not been paid by a threshold time 524. For example, the threshold time 524 may be measured from the time the customer 110 finishes scanning items 112 at a checkout station 102. If the customer 110 takes too long to pay for the order, it may be an indication that the customer 110 is leaving the store 100 without paying for the items 112. As a result, the payment station 104 may communicate the alert 526 to alert store employees that the customer 110 has not paid for the items 112. For example, the payment station 104 may sound an alarm or the payment station 104 may communicate a message to a terminal of a store employee.

In some embodiments, the payment station 104 may adjust the threshold time 524 based on a number of customers 110 who are waiting for the payment station 104. For example, if there are a large number of orders 516 awaiting payment, then the payment station 104 may increase the threshold time 524 to give the customers 110 more time to pay for their orders. Alternatively, if there are a small number of orders 516 awaiting payment, then the payment station 104 may reduce the threshold time 524 for the customers 110 to pay for their orders 516.

Figure 6:
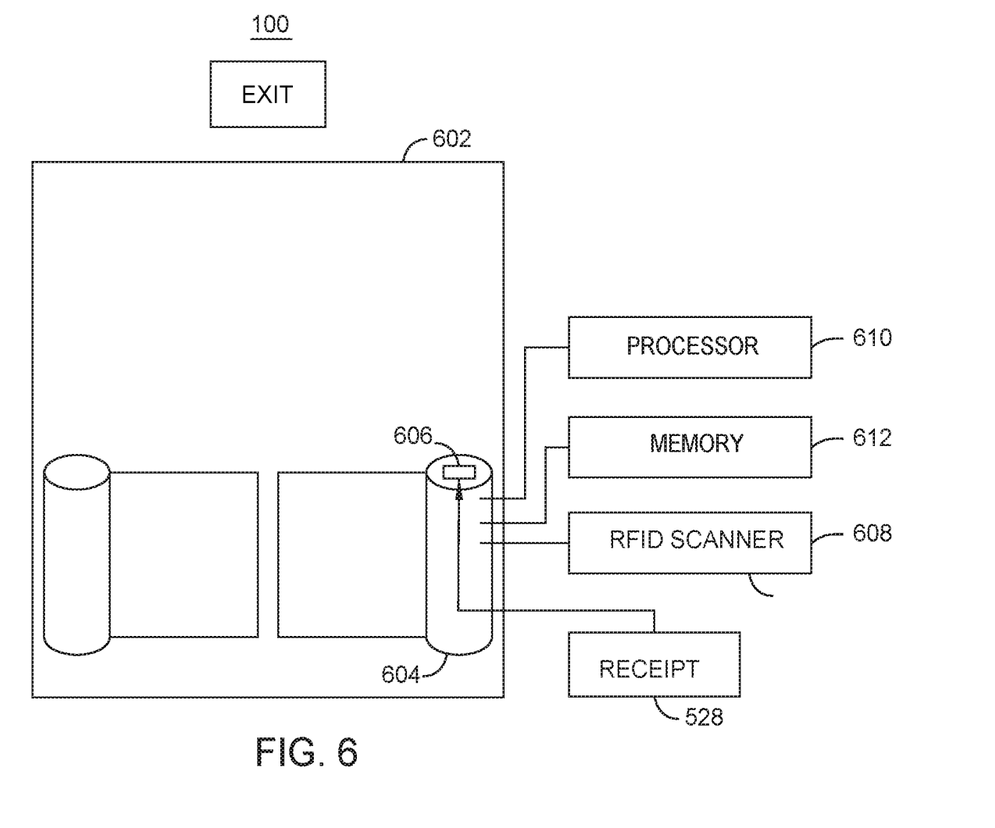
FIG. 6 illustrates an example exit of the store of FIGS. 1A and 1B.

FIG. 6 illustrates an example exit 602 of the store 100 of FIGS. 1A and 1B. As seen in FIG. 6, the exit 602 is physically blocked by a gate 604. The gate 604 prevents a customer 110 from proceeding through the exit 602 until the customer 110 has provided the receipt 528 indicating that an order has been paid. The customer 110 may scan the receipt 528 on a gate scanner 606. The gate scanner 606 may be positioned on any portion of the gate 604. In some instances, the gate scanner 606 is positioned on a separate structure proximate the gate 604. The customer 110 may scan a code on the receipt 528 using the gate scanner 606. When the receipt 528 is scanned, the gate 604 may open allowing the customer 110 to proceed through the exit 602. In the example of FIG. 6, the gate 604 includes a processor 610 and a memory 612, which are configured to perform any of the functions of the gate 604 described herein.

In some embodiments, the gate 604 includes an RFID scanner 608, which may be similar to the RFID scanner 506 within a payment station 104. The RFID scanner 608 detects RFID tags moving within a threshold distance of the gate 604. The RFID scanner 608 then communicates the detected tags to server 204 and/or database 206 to identify an order corresponding to the detected tags and to determine whether the order has been paid. If the order has been paid, the gate 604 opens to allow the customer 110 to exit, otherwise the gate 604 stays closed. If multiple corresponding orders are identified, the customer 110 can still scan the receipt 528 on the gate scanner 606 to open the gate 604. As with the payment station 104, the threshold distance of the RFID scanner 608 may be adjusted to reduce conflicts and/or overlap.

The processor 610 is any electronic circuitry, including, but not limited to microprocessors, application specific integrated circuits (ASIC), application specific instruction set processor (ASIP), and/or state machines, that communicatively couples to memory 612 and controls the operation of the gate 604. The processor 610 may be 8-bit, 16-bit, 32-bit, 64-bit or of any other suitable architecture. The processor 610 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 610 may include other hardware that operates software to control and process information. The processor 610 executes software stored on memory to perform any of the functions described herein. The processor 610 controls the operation and administration of the gate 604 by processing information (e.g., information received from the gate scanner 606, the RFID scanner 608, and the memory 612). The processor 610 may be a programmable logic device, a microcontroller, a microprocessor, any suitable processing device, or any suitable combination of the preceding. The processor 610 is not limited to a single processing device and may encompass multiple processing devices.

The memory 612 may store, either permanently or temporarily, data, operational software, or other information for the processor 610. The memory 612 may include any one or a combination of volatile or non-volatile local or remote devices suitable for storing information. For example, the memory 612 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 612, a disk, a CD, or a flash drive. In particular embodiments, the software may include an application executable by the processor 610 to perform one or more of the functions described herein.

Figure 7:
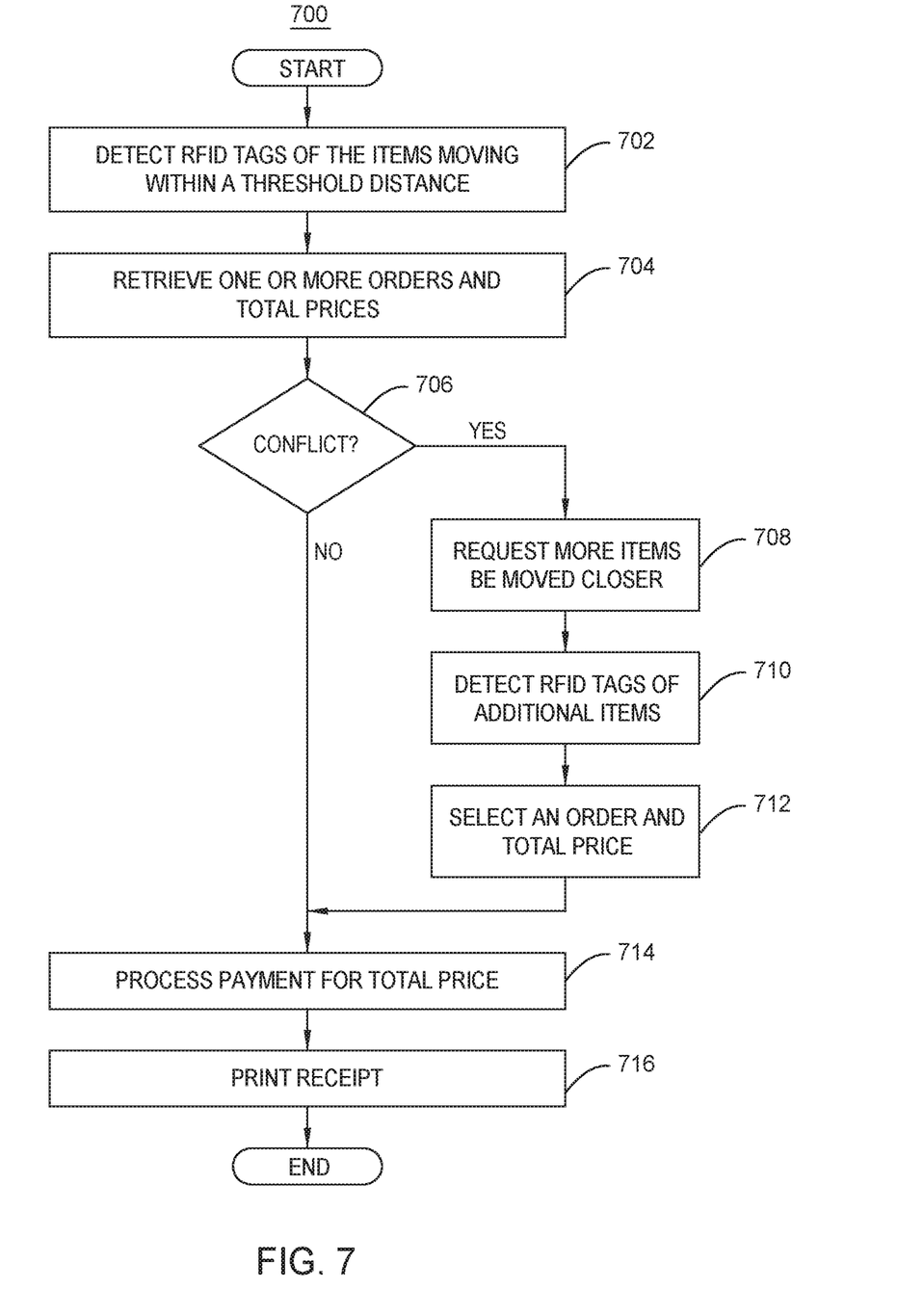
FIG. 7 is a flowchart illustrating a process for checking out in the store of FIGS. 1A and 1B.

FIG. 7 is a flow chart illustrating a process 700 for checking out in the store 100 of FIGS. 1A and 1B. Generally, the payment station 104 performs the steps of process 700. In particular embodiments by performing the process 700, the payment station 104 removes the need to install payment receivers at each checkout station 102, which reduces the size of the checkout stations 102 and makes maintenance of the checkout stations 102 simpler. For example, the payment station 104 may remove the need to install bill and coin handlers at the checkout stations 102.

The payment station 104 begins by detecting RFID tags 302 of items 112 moving within a threshold distance 402 of the payment receiver 104 in step 702. The RFID tags 302 may be moving within the threshold distance 402 because a customer 110 is moving towards the payment station 104 with items 112 to pay for an order. In step 704 the payment station 104 retrieves one or more orders 516 and total prices 518. The payment station 104 may look up and retrieve these one or more orders based on the detected RFID tags 302 moving within the threshold distance 402.

In step 706 the payment station 104 determines whether there are conflicts to be resolved. For example, the payment station 104 may determine whether more than one order 516 was retrieved in step 704. If only one order 516 was retrieved, then the payment station 104 may proceed to step 714 for payment. If more than one order 516 was retrieved, then the payment station 104 proceeds to step 708 to request more items 112 be moved closer to the payment station 104. For example, the payment station 104 may present a request 520 on a display 512 to instruct the customer 110 to move additional items 112 towards the payment station 104. As the customer moves more items 112 towards the payment station 104, the payment station 104 detects the RFID tags 302 of additional items in step 710. The payment station 104 then selects an order 516 and total price 518 based on these RFID tags of additional items 112 in step 712. In some embodiments, if the payment station 104 is unable to select an order 516 in step 712, the payment station 104 may return to step 708 to request more items 112 be moved closer to the payment station 104.

In step 714, the payment station 104 processes payment for the total price 518 of the order 516. The payment station 104 may process payment in any suitable manner. For example, the payment station 104 may receive payment through a payment receiver 508. The payment receiver 508 may include a bill handler that receives payment using bills, a coin handler that receives payment using coins, and a card scanner that receives payment using a card. After the payment station 104 verifies that the total price 518 has been paid, the payment station 104 prints a receipt 528 in step 716. A printer 510 of the payment station 104 may print the receipt 528 for the customer 110 to take.

Modifications, additions, or omissions may be made to method 700 depicted in FIG. 7. Method 700 may include more, fewer, or other steps. For example, steps may be performed in parallel or in any suitable order. While discussed as the payment station 104 performing the steps, any suitable component of system 100, such as the checkout station 102 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
scanning, by one or more checkout stations, a first plurality of items and a second plurality of items;
determining, by the one or more checkout stations, a first total price for the first plurality of items and a second total price for the second plurality of items, each item of the first plurality of items and the second plurality of items coupled to a radio frequency identification (RFID) tag that identifies that item;
generating a first order identifying the RFID tags coupled to the first plurality of items and a second order identifying the RFID tags coupled to the second plurality of items;
storing the first order, the first total price, the second order, and the second total price in a database;
detecting, by an RFID scanner of a centralized payment station, one or more of the RFID tags of the first plurality of items moving within a threshold distance of the centralized payment station;
retrieving, by a hardware processor of the centralized payment station, from the database, and based on the detected one or more RFID tags, the first order and the second order;
in response to retrieving the first order and the second order from the database, requesting that additional items of the first plurality of items be moved within the threshold distance of the centralized payment station;
detecting, by the RFID scanner, the RFID tags coupled to the additional items moving within the threshold distance;
determining, based on the RFID scanner detecting the RFID tags coupled to the additional items moving within the threshold distance, that the first order rather than the second order is being presented for payment;
selecting, by the hardware processor, the first total price rather than the second total price in response to determining that the first order is being presented for payment; and processing, by the hardware processor, a payment in satisfaction of the first total price.

2. The method of claim 1, wherein the one or more of the RFID tags is fewer than the first plurality of items.

3. The method of claim 1, wherein requesting that the additional items be moved within the threshold distance comprises displaying a message requesting that the additional items be moved towards the centralized payment station.

4. The method of claim 1, further comprising communicating, by the hardware processor, an alert if the first total price is not paid within a threshold period of time.

5. The method of claim 4, further comprising increasing, by the hardware processor, the threshold period of time based on a number of users who are waiting for the centralized payment station.

6. The method of claim 1, further comprising:
detecting, by an RFID scanner of a gate, the one or more of the RFID tags of the first plurality of items moving within a threshold distance of the gate;
receiving, in response to communicating the detected one or more RFID tags, an indication that the first plurality of items have been paid for; and
opening the gate in response to the indication.

7. The method of claim 1, wherein the payment is made using one or more of a bill receiver and a coin receiver of the centralized payment station.

8. A system comprising:
one or more checkout stations configured to:
scan a first plurality of items and a second plurality of items;
determine a first total price for the first plurality of items and a second total price for the second plurality of items, each item of the first plurality of items and the second plurality of items coupled to an RFID tag that identifies that item;
generate a first order identifying the RFID tags coupled to the first plurality of items and a second order identifying the RFID tags coupled to the second plurality of items; and
store the first order, the first total price, the second order, and the second total price in a database;
a centralized payment station comprising:
an RFID scanner configured to detect one or more of the RFID tags of the first plurality of items moving within a threshold distance of the centralized payment station; and
a hardware processor configured to:
retrieve, from the database and based on the detected one or more RFID tags, the first order and the second order;
in response to retrieving the first order and the second order from the database, request that additional items of the first plurality of items be moved within the threshold distance of the centralized payment station, wherein the RFID scanner is further configured to the RFID tags coupled to the additional items moving within the threshold distance;
determine, based on the RFID scanner detecting the RFID tags coupled to the additional items moving within the threshold distance, that the first order rather than the second order is being presented for payment;
select the first total price rather than the second total price in response to determining that the first order is being presented for payment; and
process a payment in satisfaction of the first total price.

9. The system of claim 8, wherein the one or more of the RFID tags is fewer than the first plurality of items.

10. The system of claim 8, wherein requesting that the additional items be moved within the threshold distance comprises displaying a message requesting that the additional items be moved towards the centralized payment station.

11. The system of claim 8, wherein the hardware processor is further configured to communicate an alert if the first total price is not paid within a threshold period of time.

12. The system of claim 11, wherein the hardware processor is further configured to increase the threshold period of time based on a number of users who are waiting for the centralized payment station.

13. The system of claim 8, further comprising:
a gate; and
an RFID scanner of the gate configured to detect the one or more of the RFID tags of the first plurality of items moving within a threshold distance of the gate, wherein the gate is configured to receive, in response to communicating the detected one or more RFID tags, an indication that the first plurality of items have been paid for and to open in response to the indication.

14. The system of claim 8, wherein the centralized payment station further comprises a bill receiver and a coin receiver and wherein the payment is made using one or more of the bill receiver and the coin receiver.

15. A payment station comprising:
an RFID scanner configured to detect one or more RFID tags of a first plurality of items moving within a threshold distance of a centralized payment station;
a hardware processor configured to: to
retrieve, from a database and based on the detected one or more RFID tags, a first order and a second order, wherein the first order identifies RFID tags coupled to the first plurality of items and the second order identifies RFID tags coupled to a second plurality of items;
in response to retrieving the first order and the second order from the database, request that additional items of the first plurality of items be moved within the threshold distance of the centralized payment station, wherein the RFID scanner is further configured to the RFID tags coupled to the additional items moving within the threshold distance;
determine, based on the RFID scanner detecting the RFID tags coupled to the additional items moving within the threshold distance, that the first order rather than the second order is being presented for payment;
select a first total price of the first order rather than a second total price of the second order in response to determining that the first order is being presented for payment; and
process a payment in satisfaction of the first total price; and
a printer configured to print a receipt after the payment is processed.

16. The payment station of claim 15, wherein requesting that the additional items be moved within the threshold distance comprises displaying a message requesting that the additional items be moved towards the centralized payment station.

17. The payment station of claim 15, wherein the hardware processor is further configured to communicate an alert if the first total price is not paid within a threshold period of time.

18. The payment station of claim 17, wherein the hardware processor is further configured to increase the threshold period of time based on a number of users who are waiting for the centralized payment station.

19. The payment station of claim 15, wherein a gate is configured to open in response to an indication that the first plurality of items have been paid for, wherein the indication is generated based on the one or more RFID tags of the first plurality of items detected by an RFID scanner of the gate.

20. The payment station of claim 15, further comprising a bill receiver and a coin receiver, wherein the payment is made using one or more of the bill receiver and the coin receiver.

* * * * *

UNITED STATES PATENT AND TRADEMARK OFFICE
CERTIFICATE OF CORRECTION

PATENT NO. : 11,288,652 B1
APPLICATION NO. : 17/085644
DATED : March 29, 2022
INVENTOR(S) : David Steiner et al.

It is certified that error appears in the above-identified patent and that said Letters Patent is hereby corrected as shown below:

On the Title Page

On the page 2, in Column 2, item (56) under "Other Publications", Line 11, delete "Internetof" and insert -- Internet of --.

In the Claims

In Column 16, Line 36, in Claim 15, delete "to: to" and insert -- to: --.

Signed and Sealed this
Seventh Day of June, 2022

Katherine Kelly Vidal
*Director of the United States Patent and Trademark Office*